Figure 1:
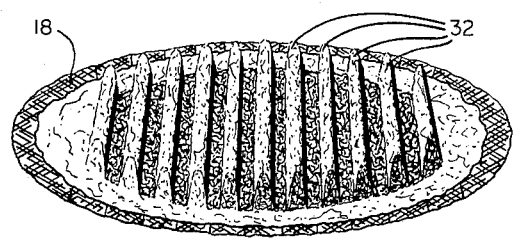

May 3, 1966  J. A. YOUNG ETAL  3,249,491

PROCESS FOR MOLDING A GLASS FIBER AEROSOL FILTER

Filed July 15, 1963

INVENTORS
JAMES A. YOUNG
ROBERT T. LUCAS

BY *Richard C. Reed*

ATTORNEY

United States Patent Office 3,249,491
Patented May 3, 1966

3,249,491
PROCESS FOR MOLDING A GLASS FIBER
AEROSOL FILTER
James A. Young, Hillcrest Heights, Md., and Robert T. Lucas, Alexandria, Va., assignors to the United States of America as represented by the Secretary of the Navy
Filed July 15, 1963, Ser. No. 295,613
1 Claim. (Cl. 162—116)

The invention described herein may be manufactured and used by or for the Government of the United States of America for governmental purposes without the payment of any royalties thereon or therefor.

This application is a continuation-in-part of application Serial No. 64,972, filed October 25, 1960, now abandoned for Process for Forming a Glass Fiber Filter, which is a division of application Serial No. 837,562, filed September 1, 1959, for Aerosol Filter, now U.S. Patent 3,069,831, issued December 25, 1962.

This invention relates to a process for molding an aerosol filter made entirely of glass fibers. More particularly, the invention relates to a process for depositing glass fibers on a matrix to form a filter unit with a raised surface configuration in a continuous filter area.

The process of the present invention is employed particularly for molding an aerosol filter of the character set forth and claimed in U.S. Patent No. 3,069,831, issued December 25, 1962, to James A. Young and Robert T. Lucas, who are also the applicants herein. The aerosol filter described in said patent is molded of glass fiber blends to provide high efficiency in removing particulate matter such as dust, smoke, soot, bacteria, tars, oils, etc., from the air and at the same time to contribute to the comfort and safety of its user by providing for a lower breathing resistance in removing particulate matter as fine as 0.3 micron. The fiber blends employed for this purpose consist of a larger amount of fiber having average fiber diameters in the range of about 1 to 3 microns and a smaller amount of fiber with average fiber diameters in the range of about 0.15 to 0.50 micron. The fiber blend is deposited into a continuous, relatively thin matting which is shaped into a plurality of raised ridges of nearly rectangular cross-section, the ridges tapering at each end thereof into the flat margin surrounding said raised ridges. The novel design of the aerosol filter imparts mechanical strength to the fiber composition without any need for a binder material, support element within the filter structure or any backing layer that lends weight and bulk to the aerosol filter without contributing in any way to the filtering process. The all-glass composition provides an aerosol filter which is compact, resistant to chemical action, of minimum weight and of sufficient strength to withstand shock under normal service conditions.

The aerosol filter is molded into a raised surface configuration by pouring a glass fiber dispersion over a wire screen matrix having the desired pattern and draining the liquid through the matrix to deposit the fibers thereon into a continuous glass fiber matting having the desired thickness and surface structure.

In depositing the fibers on the wire screen matrix difficulty has heretofore been experienced in effecting a fiber matting of uniform thickness. This difficulty has been due in large measure to the fact that the fibers tend to settle on the crests and valleys while a lesser amount settles on the lateral surface of the ridges. The problem involved is that of distributing the fiber more uniformly during deposition without disrupting the overall thickness of the matting or impairing the surface texture. The deposited fibers should settle uniformly without disruptions which lessen the filter efficiency.

The present invention provides a method for forming a uniform fiber matting over an increased filter surface containing a plurality of parallel ridges or convolutions of relatively rectangular cross-section. The present process provides an aerosol filter in which fibers of a specific average fiber length are bonded together by the attractive forces which come into prominence in finely divided matter. By proper selection of fibrous glass, slag or other mineral wool composition of suitable diameter blends, an adhering fiber mat composition is formed which does not tear or crumble.

The process of the present invention is capable of molding an aerosol filter of glass fiber blends without binders or interfiber bonders previously specified in forming glass fiber sheets. The fiber mat properties of the present filter are based principally on blends of fiber diameters and average fiber length; the all-glass fiber composition is thus capable of providing improved filter properties, greater than those encountered in the glass fiber sheets of the prior art.

The molding process described herein provides a filter mat which is contoured to the desired shape without the use of shaping operations, such as, folding, bending, wrinkling, etc., that have been employed in the past to increase the surface area of paper sheets. It should be remarked, the present aerosol filter provides a unique ribbed structure with its raised parallel ridges; its design provides mechanical strength and durability to an otherwise weak fiber structure.

It should also be noticed that in the present molded process, the fiber composition is treated and deposited to enhance the filtration properties thereof, without the usual processing requirements of the paper-making art, which emphasize sheet strength and handling. Whatever may be the intended usage of a glass fiber sheet, the methods previously employed in stock preparation and bonding are ultimately based upon papers with substantial tensile and tear strength. The present process provides an improved filter medium in which the fiber is treated for the purpose of achieving maximum filtration while tensile and tear strengths which are decreased in the fiber are nevertheless sufficiently maintained in the novel filter structure.

The present process is used for molding an aerosol filter unit suitable for gas mask cannisters, respirator housings, etc. The filter is capable of high efficiency in removing solid and liquid particulate matter, such as dust, smoke, soot, bacteria, tars, oils, etc., from the air, while the novel design of said filter contributes to the comfort and safety of its user by reducing the breathing resistance.

It is therefore an object of the present invention to provide a novel process for molding an aerosol filter from an aqueous dispersion of fine glass fibers.

Another object of the invention is to provide a process for forming a glass fiber matting fabricated with a surface configuration of raised ridges without the prior art requirements of pressing, bending or folding the fiber mat.

A further object of the invention is to provide a process for molding an all-glass fiber aerosol filter in which the fiber composition contains no binder material, structural support and the filter does not require a backing member.

A still further object of the invention resides in the provision of a process for molding a glass fiber aerosol filter in which the fiber composition is treated to provide improved filter characteristics.

Figure 2:
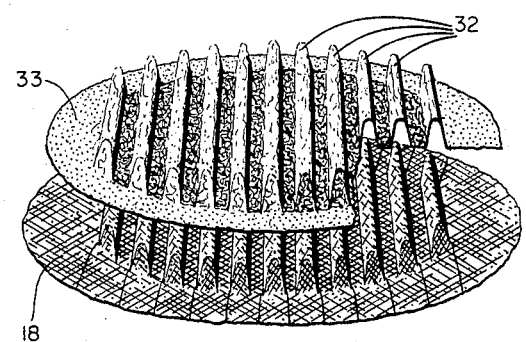

Further objects and details will appear from the following description of the invention in conjunction with the following drawing, wherein:

FIG. 1 shows the fiber matting formed on a wire screen matrix in accordance with the present invention; and FIG. 2 shows the fiber filter removed from the matrix and cut away in part to reveal its ridged structure.

A glass fiber blend is formed into an aqueous dispersion of suitable acidity and the fibers are beaten sufficiently to produce a fiber of uniform average length. The fiber dispersion is then poured over a wire screen matrix shaped into a design of raised surface configuration and the fibers are deposited thereon in a continuous relatively thin fiber matting which assumes the desired surface pattern. The dried fiber filter retains its form without a backing layer.

In processing commercially available glass fibers which are normally employed in paper sheets, care is exercised to obtain effective circulation and dispersion without shattering or reducing the length of the fibers. Glass fibers are circulated in beaters with the beater roll lifted to minimize mechanical damage. In the present process strands of fibrous glass are beaten, initially to disperse and open up the fiber strands and the beating operation is continued for the purpose of obtaining average fiber lengths of about ⅛ inch. Chopped strands of glass fibers are obtained from the manufacturer in paper-making requisites of about 5/16 to 9/16 inch and are reduced by blenders or beaters more desirably to an average fiber length of about ⅛ inch. It is of great importance that the beating step be controlled to prevent excessive shattering of the fibers which can easily reduce glass fibers to fragments that lack strength properties. The beating step may be adequately carried out in the laboratory with high speed mixers and blenders by the turbulence-cutting power. In large scale operations the use of a paper mill refiner may be employed to determine suitable operating conditions by actual trial because the actual beating step depends on the mechanical action characteristic of each individual unit.

In the laboratory good results are usually obtained by using a Waring blender operated at high speed mixing, the turbulence-cutting power being sufficient to reduce the glass fibers to an average fiber length of about ⅛ inch. Fibers of a given diameter are mixed with sufficient water to form a uniform suspension and then the operation is continued until a more desirable fiber length is obtained. The beating operation is more advantageously performed in an acidified medium at a pH of 3. With a Waring blender the fibers are properly treated in about 5–12 minutes.

With larger fiber quantities requiring a standard paper beater, the processing period can be determined by testing for the strength quality of flat disks formed from the processing fibers. The reduction of strength properties is taken as an indication of the extent to which the fibers may be reduced in length. Average fiber length of less than ⅛ inch cannot provide tensile strength and particularly tear resistance is inadequate for molding and removing the fiber filter intact from the matrix screen. After the beating process is completed, fibers of different average diameters may be blended to any desired filtering need. The processed furnish is then diluted sufficiently with water to form an easily filtrable dispersion which is then poured on the wire matrix, the amount of fiber deposited depending upon the thickness and size of the fiber matting. A thickness of about 15–25 mils is normally the range for aerosol filters as contemplated herein for personnel use. After the water has drained from the dispersion, the fibers are deposited on the matrix surface and have assumed the shape thereof.

In the process of molding an aerosol filter according to the invention, the operation may be as follows and as illustrated in the drawing:

A glass fiber blend containing by weight 83.3% of a fiber having an average fiber diameter of 2 microns and 16.7% of a fiber having an average fiber diameter of 0.35 micron is combined initially as dry fiber and then dispersed in 600 ml. of water. The dispersion is acidified to a pH 3 with hydrochloric acid and mixed in a Waring blender for 5 minutes. The dispersion is then diluted to 7 liters and poured into a cylinder which retains the wire screen matrix at the open base thereof. The water drains through the wire screen allowing the fiber material, as shown in FIG. 1, to deposit on wire screen matrix 18 and form a fiber matting with raised ridges 32. The matting is air blown sufficiently to allow it to be pried loose from the screen without tearing. The separated filter unit shown in FIG. 2 has sufficient tensile strength to resist tearing and the fibers have sufficient coherence to resist frittering or flaking. Its molded design with parallel ridges, shown in the cut section of FIG. 2, does not lose its shape or change dimensions. The novel design is capable of holding together the parallel ridges 32 by means of the flat margin 33 which surrounds the ridged surface.

After the filter unit is removed from the matrix, it is dried thoroughly and tested for filtration and air flow properties. The dried filter unit weighs about 5.3 grams and has a matting thickness of about 20 mil. The particular design of FIG. 2 has 11 raised ridges of about 7/16 inch in hight in a circular surface of about 4¾6 inches. The flat sealing margin 33 is trimmed and coated with a latex composition or other suitable adhesive as a means of sealing the filter surface in cannister or respirator housings. The air flow resistance of the present aerosol filter at 24 liters per minute is about 10 mm. of water and the efficiency in removing particulate matter of 0.3 micron is as high as 99.987.

The process of the present invention enables the filter unit to be molded of glass fibers alone without binding materials and without any sheet-bending operation for forming a raised filter surface. In addition, the present process improves the filtering properties of an all-glass composition in an aerosol filter that is capable of withstanding shock without suffering deformation or rupture.

It is of course understood that the present process relates to a preferred embodiment thereof and that the invention may be practiced otherwise than as specifically presented in the illustrative example and that numerous modifications or alterations may be made therein without departing from the spirit and scope of the invention as set forth in the appended claim.

What is claimed is:

The process of molding a thin, circular glass fiber aerosol filter element having a surface configuration of parallel raised ridges of substantially rectangular cross-section within an encircling flat margin comprising the steps of (a) forming a beaten acidified aqueous dispersion of a glass fiber mixture having an average fiber length of approximately ⅛ inch and containing by weight about 80% of fibers having an average diameter of about 2 microns and about 20% of fibers having an average diameter of about 0.35 micron and sufficient water to be a readily filtrable fiber dispersion, (b) pouring an amount of said aqueous dispersion glass fibers over a wire screen matrix having a surface configuration which corresponds to that of said filter element to deposit said fibers thereon and form said filter element, and (c) removing said filter element from said matrix after said filter element has been sufficiently dried thereon.

References Cited by the Examiner

UNITED STATES PATENTS

| | | | |
|---|---|---|---|
| 369,717 | 9/1887 | Hyatt | 210—510 |
| 2,708,982 | 5/1955 | McGuff | 210—505 |

OTHER REFERENCES

Owens-Corning Fiberglas, 15 pages, published February 1954, 162–156.

Schulmeyer: Glass Fibers in Papermaking, PTJ, vol. 140, No. 40, October 1, 1956, pages 26 and 27.

DONALL H. SYLVESTER, *Primary Examiner*.

H. R. CAINE, *Assistant Examiner*.